United States Patent
Liu et al.

(10) Patent No.: US 10,997,637 B2
(45) Date of Patent: May 4, 2021

(54) METHOD AND SYSTEM FOR DETERMINING QUALITY OF APPLICATION BASED ON USER BEHAVIORS OF APPLICATION MANAGEMENT

(71) Applicant: Peking University, Beijing (CN)

(72) Inventors: Xuanzhe Liu, Beijing (CN); Gang Huang, Beijing (CN); Hong Mei, Beijing (CN); Huoran Li, Beijing (CN); Xuan Lu, Beijing (CN)

(73) Assignee: Peking University, Beijing (CN)

( * ) Notice: Subject to any disclaimer, the term of this patent is extended or adjusted under 35 U.S.C. 154(b) by 303 days.

(21) Appl. No.: 15/746,431

(22) PCT Filed: Sep. 7, 2016

(86) PCT No.: PCT/CN2016/098293
§ 371 (c)(1),
(2) Date: Jan. 22, 2018

(87) PCT Pub. No.: WO2017/107571
PCT Pub. Date: Jun. 29, 2017

(65) Prior Publication Data
US 2018/0285947 A1    Oct. 4, 2018

(30) Foreign Application Priority Data

Dec. 24, 2015  (CN) .......................... 201510983204.6

(51) Int. Cl.
*G06Q 30/02* (2012.01)
*G06F 17/18* (2006.01)
(Continued)

(52) U.S. Cl.
CPC ......... *G06Q 30/0282* (2013.01); *G06F 17/18* (2013.01); *G06K 9/00335* (2013.01); *G06K 9/6256* (2013.01); *G06K 9/6262* (2013.01)

(58) Field of Classification Search
CPC ....... G06Q 30/06; G06F 21/00; G06F 21/577; G06F 17/30
See application file for complete search history.

(56) References Cited

U.S. PATENT DOCUMENTS 6,714,925 B1 *  3/2004  Barnhill ............... G06K 9/6269
                                                706/48
8,417,715 B1 *  4/2013  Bruckhaus ............. G06Q 10/04
                                                707/758

(Continued)

*Primary Examiner* — Oluseye Iwarere
(74) *Attorney, Agent, or Firm* — SV Patent Service

(57) ABSTRACT

The present invention relates to a method and system for determining the quality of an application based on user behaviors of application management. The method includes: 1) preprocessing data on user behaviors of application management to obtain a sequence of management behaviors as a training set; 2) extracting features of the user behaviors from the obtained sequence of management behaviors; 3) establishing a multi-dimensional independent variable space using the extracted behavior features, wherein each application in the training set is considered as a point in the space; training a model according to the space; and debugging to obtain optimal model parameters and a definite regression model; 4) arranging the data of the management behaviors of each application to be predicted according to step 1) and step 2), and then inputting the result into the regression model, wherein an output of the regression model is the result of the application quality determination. The present invention can effectively remove irrelevant features and exert the quality expression ability of relevant features, and can obtain more accurate results for evaluation of application quality.

8 Claims, 1 Drawing Sheet

(51) Int. Cl.
*G06K 9/00* (2006.01)
*G06K 9/62* (2006.01)

(56) References Cited

U.S. PATENT DOCUMENTS

| | | | | |
|---|---|---|---|---|
| 10,332,245 | B1* | 6/2019 | Price | G06N 3/0454 |
| 2002/0042786 | A1* | 4/2002 | Scarborough | G06Q 10/10 |
| | | | | 706/21 |
| 2003/0176931 | A1* | 9/2003 | Pednault | G06K 9/6282 |
| | | | | 700/31 |
| 2005/0234688 | A1* | 10/2005 | Pinto | G05B 17/02 |
| | | | | 703/6 |
| 2005/0234697 | A1* | 10/2005 | Pinto | G06Q 30/0254 |
| | | | | 703/22 |
| 2005/0234698 | A1* | 10/2005 | Pinto | G06Q 30/02 |
| | | | | 703/22 |
| 2005/0234753 | A1* | 10/2005 | Pinto | G06Q 30/02 |
| | | | | 700/44 |
| 2005/0234760 | A1* | 10/2005 | Pinto | G06Q 30/02 |
| | | | | 703/2 |
| 2005/0234761 | A1* | 10/2005 | Pinto | G06Q 10/063 |
| | | | | 705/7.28 |
| 2005/0234762 | A1* | 10/2005 | Pinto | G06Q 30/02 |
| | | | | 700/44 |
| 2005/0234763 | A1* | 10/2005 | Pinto | G06Q 30/0201 |
| | | | | 706/21 |
| 2009/0094090 | A1* | 4/2009 | Dow | G06Q 10/06 |
| | | | | 705/7.14 |
| 2010/0317420 | A1* | 12/2010 | Hoffberg | G07F 17/323 |
| | | | | 463/1 |
| 2012/0036220 | A1* | 2/2012 | Dare | H04L 67/04 |
| | | | | 709/217 |
| 2012/0278194 | A1* | 11/2012 | Dewan | G06Q 30/0205 |
| | | | | 705/26.1 |
| 2013/0069792 | A1* | 3/2013 | Blevins | G06F 17/18 |
| | | | | 340/815.4 |
| 2013/0318613 | A1* | 11/2013 | Archer | G06F 21/577 |
| | | | | 726/25 |
| 2014/0180982 | A1* | 6/2014 | Murphy | G06N 5/022 |
| | | | | 706/14 |
| 2014/0351046 | A1* | 11/2014 | Carlyle | G06Q 30/0255 |
| | | | | 705/14.53 |
| 2015/0066355 | A1* | 3/2015 | Siegel | G01C 21/3492 |
| | | | | 701/410 |
| 2015/0081660 | A1* | 3/2015 | Margulis | G06Q 30/0263 |
| | | | | 707/706 |
| 2015/0261754 | A1* | 9/2015 | Bai | G06Q 30/0282 |
| | | | | 707/749 |
| 2015/0262198 | A1* | 9/2015 | Bai | G06Q 30/0201 |
| | | | | 705/7.31 |
| 2016/0179955 | A1* | 6/2016 | Delli Santi | G06Q 30/00 |
| | | | | 707/709 |
| 2016/0188602 | A1* | 6/2016 | Glover | G06Q 50/01 |
| | | | | 707/749 |
| 2016/0373465 | A1* | 12/2016 | Glover | G06F 16/951 |
| 2017/0046246 | A1* | 2/2017 | Kaulgud | G06F 11/3664 |
| 2020/0258008 | A1* | 8/2020 | Shaker | G06K 9/6267 |
| 2020/0293828 | A1* | 9/2020 | Wang | G06K 9/6257 |

* cited by examiner

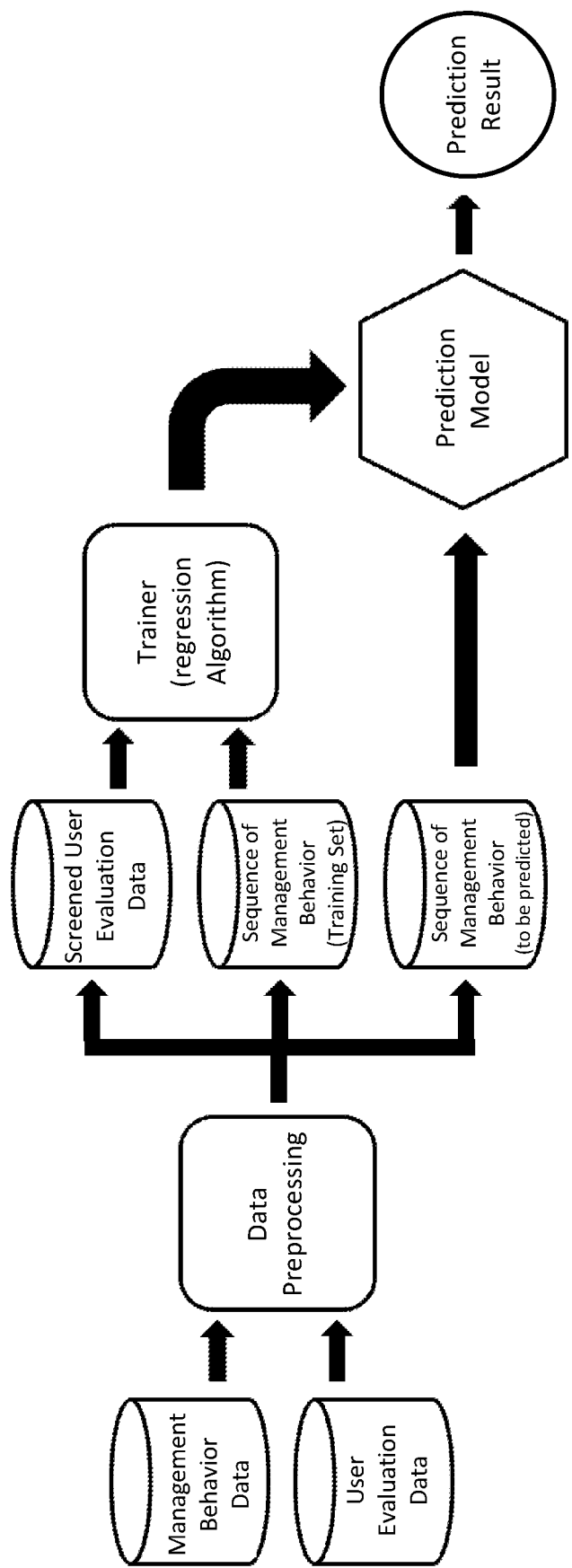

METHOD AND SYSTEM FOR DETERMINING QUALITY OF APPLICATION BASED ON USER BEHAVIORS OF APPLICATION MANAGEMENT

TECHNICAL FIELD

The present invention relates to a method and system for extracting characteristics of users' behaviors in managing applications of mobile device users, and using regression algorithms to predict the quality of the mobile applications lacking user evaluations based on the behavioral characteristics.

BACKGROUND OF THE INVENTION

With the development of mobile devices (smartphones, tablets, smart watches, etc.), the type and quantity of mobile device applications (i.e. apps) are showing a trend of explosive growth. Accurately measuring the quality of an application has become a very important issue, which has very significant implications to users for their learning about applications for better selections before downloads, to developers for knowing more about feedbacks of their own and competitors' applications in the marketplace, and to application market managers for providing more accurate recommendations. The most intuitive and accurate evaluation criteria are the users' appraisal of applications in the application market, including natural language evaluation and scoring, among which the scoring is the most intuitive and effective. However, in the current mobile application market, there is a widespread problem that users are not accustomed to evaluating applications, resulting in few user reviews for some applications. The qualities of these applications are difficult to determine by user evaluation.

In addition to the relatively intuitive and accurate evaluation method of user evaluations, the mainstream application market uses the total number of application downloads or the number of users who have downloaded an application as measures for the quality of the application. The basic principle is to use user selection behaviors of an application to determine its quality. These are the only indicators for appraising the less-rated applications mentioned above. However, relying on such simple metrics alone may not truly reflect the quality of the application. For example, some applications have high downloads and total downloading users, but these may be due to the success of the marketing efforts when the application was released; the quality of these applications may not be high, a large number of users may directly uninstalled after initial trial use. At the same time, there may be a class of applications whose downloads and downloads are not that much, but their users keep using them and updated with the current versions. These applications tend to have higher quality. Therefore, simple indicators such as download numbers and downloading user numbers may not lead to accurate evaluation.

These indicators based on user behaviors are reasonable, but one of its problems is that they do not fully utilize the amount of information in the user behaviors. For example, if the majority of users of an application are uninstalled shortly after downloading the application, it is likely that the quality of the application is not high enough so that a large number of users choose to give up after using them. On the other hand, if an application has some users having uninstalled the application and then choosing to reinstall, then it is very likely that the application is of good quality so the user really needs it to reinstall accordingly. Inspired by this, there are many valuable features in the sequence of actions that users take to manage their applications. If one can dig out valid features, one can use these features to arrive at a more accurate assessment of applied quality.

In the conventional technologies, Chinese patent No. CN101404650B, entitled "A method and system for subdividing network application service quality", provided an appropriate network quality mark to implement fine graining of qualities the network application service according to the application program currently used by the user, In addition, "the method and system for determining the quality of an application" (application number: 201110247330.7) is based on the convergence value of the average value reported by a large number of mobile terminals, which shows the common quality status of the application, which can reflect the quality of the application. However, none of these technologies makes effective use of the valuable features of the user's management behavior of the application, so that a more accurate application quality evaluation can not be obtained.

In view of the above, there is a need for a method of extracting behavioral features from application management behaviors and using the extracted behavioral characteristics to determine the quality of applications that are less user-evaluated.

SUMMARY OF THE INVENTION

The purpose of the present invention is to use a regression algorithm to determine the quality of an application through the features in user management behaviors related to the application. The regression model is trained using the management behaviors of those applications that contain more user evaluations. The quality prediction for applications with fewer user comments is made using the trained regression model.

In the present invention, the user's application management behavior data include three behaviors: downloading an application, uninstalling an application, and updating an application. The records of user management behavior data contain three domains: a user identifier for a user conducting a management behavior, a identity for the application corresponding to the management behavior, and a time when a management behavior occurred.

The presently disclosed method for determining an application quality based on a user application management behaviors includes four main steps: (1) data preprocessing; (2) behavioral feature extraction; (3) model training; and (4) utilizing the features to determine the application quality.

(1) Data Preprocessing:

First, applications are screened using thresholding, statistical analyses, and other methods to select reliable applications into a training set. Then, the following data preprocessing is performed on the user management behavior data associated with applications in the training set: "D" indicates an application downloading behavior, "U" indicates an application uninstall behavior, and "P" indicates an application updated behavior. The user management behavior data between each user and each application are sorted in a chronological order to obtain a sequence of management behaviors. For example, the sequence can include:

DPPU.

The sequence above indicates that the user has first downloaded the application, then updated twice, and finally uninstalled the application. In addition, adding "S" to the head of the original sequence means starting the sequence and adding "E" to the end to indicate the end of the sequence to obtain the final sequence:

SDPPUE.

To ensure that the method is as accurate as possible, further screening of the sequence data is required. Finally, the sequence in the training model is constructed according to the sequence of management behaviors after screening. The method for extracting behavioral features is based on the training set.

(2) Behavioral Feature Extraction:

The behavioral features of each application include the following two: the number of management behaviors in the sequence associated with the application, and the average length of the sequence of management behaviors. In addition, the features of the application may include the maximum number of consecutive steps (including S and E) in a sequence of management behaviors, and time intervals between continuous management behaviors.

For each feature, the number of such features in the application is extracted, and finally the average number of the features in a sequence of management behaviors is obtained, as a value of such feature (for example, an application has a total of 100 sequences of management behaviors. One of the features has 200 appearances. Then the value for this feature is 200/100=2). The total number of features is N.

(3) Model Training:

After the behavioral feature extraction is completed, N features are used to establish an N+1 dimensional independent variable space. Each application in the training set is considered as a point in space. The value of each independent variable dimension is the value of the feature corresponding to the dimension. The a value of a dependent variable in the multidimensional independent variable space is a linear number in a [0,1] interval for a user's rating of application (0 is the lowest and 1 is the highest). In this space, the model is trained using the method of multi-folding training. Optimal model parameters are debugged. Finally, a definite regression model is obtained.

(4) Using the Features to Determine the Quality of Applications:

Using the regression model obtained by training, the management behavior data of each application to be predicted are extracted according to the above steps (1) and (2). The extracted features are input into the regression model; and outputting a determination for quality of the to-be-predicted application by the regression model.

A system for determining the quality of an application based on user behaviors of application management includes:

A data preprocessor is responsible for pre-process user management behavior data of applications, and sorting the user management behavior data between each user and each application in a chronological order to obtain a sequence of management behaviors as a training set;

A behavioral feature extractor responsible for extracting features of user application management behaviors from the sequence of management behaviors;

A trainer responsible for establish a multi-dimensional independent variable space using the extracted features, wherein each application in the training set is considered as a point in the space, wherein a value of an independent variable dimension is value of a feature corresponding to the independent variable dimension, wherein the trainer trains the model in the space and debugs the model to obtain optimal model parameters and a definite regression model; and A predictor responsible for receiving features of user application management behaviors of a to-be-predicted application extracted by the data preprocessor and behavioral feature extractor, and then inputting the obtained features into the trained regression model. The regression model outputs a determination for quality of the to-be-predicted application.

The invention extracts behavioral features from the application management behaviors and uses the extracted behavioral features to determine the quality of the applications that have fewer user evaluations so as to obtain more accurate evaluation of application quality. The significance of the disclosed method and system include the following: they allow users to quickly understand applications and to make more appropriate choices before downloading apps; they also allow developers to more quickly understand feedbacks to their own and competitor applications in the market; and they allow application market management to provide more accurate recommendations.

Compared with the conventional technologies, the present invention first determines the quality of an application using multiple continuous user management behaviors and time intervals between the continuous user management behaviors. At the same time, the present invention is also the first to use a regression algorithm to determine the quality of an application based user management behaviors. The above described characteristics of the present invention can more effectively remove irrelevant features in the process of determining the qualities of the applications, and more effectively express the application qualities of relevant characteristics. Therefore, in summary, the present invention can obtain more accurate evaluation results than the conventional technologies.

BRIEF DESCRIPTION OF THE DRAWINGS

FIG. 1 is a technical architecture diagram of the present invention.

DETAILED DESCRIPTION OF IMPLEMENTATIONS

The following description provides a specific implementation based on the original evaluation data to determine the application quality, including data description, hardware deployment, and software implementation. FIG. 1 is a schematic diagram of a specific technology.

1. Data Description

The data used in this deployment comes from a large Android mobile app market, in the form of text files, include the following two sections:

(1) Applied Management Behavior Data.

Each management behavior is recorded with a row of data, including all of the domains described earlier, that is, a user ID for who has conducted the management behavior, ID of the application managed by the behavior (i.e., the name of the application package), and the time when the management behavior occurred.

(2) User Evaluation Data.

The users app ratings are simply divided into likes and dislikes. Therefore, an app's user rating is calculated according to the "favorite appraisal number/total appraisal number, which has a value in a range [0, 1]. Each application is recorded a row of data.

2. Hardware Deployment

The hardware environment includes a server installed with Ubuntu 14.04 LTS, on which all source data and software are deployed.

3. Software implementation

Software deployment includes the following components:

(1) Data Preprocessor

The data preprocessor includes Python scripts, Ubuntu commands, and a unified control script file. The data preprocessor takes the original text data as input, sorts the data, and generates a sequence of management behaviors described in the previous section.

The data preprocessor then filters the data. The purpose of application filtering is to filter out applications where user reviews are ambiguous, to keep only applications with clear user preference. Therefore, the filtering operation performs a binomial distribution probabilistic test for all applications based on the number of evaluations of likes and dislikes, and retains the only those apps in which user's preferences for the apps are statistically 95% probable. Then, the remaining management behaviors for application are sorted, to produce a sequence containing at least two operations aside S and E, which is the final training set.

(2) Behavioral Feature Extractor

The behavioral feature extractor is implemented by a Python script to input the training set data generated by the data preprocessor and to count the number of features in the sequence of management actions.

In this deployment, the features used are management behavioral features that include up to three consecutive management behaviors (including S, E) and time intervals between the consecutive management behaviors. The time intervals between the two management behaviors are divided into four cases: less than 24 hours, 24 to 48 hours, 48 to 72 hours, and more than 72 hours. Each 24 hour period is indicated by T; more than 72 hours is indicated *. Here are some examples of features that meet the above definition:

D: single download;

DU: uninstall after download with the time interval not exceeding 24 hours;

SDTTP: the first behavior of the sequence is a download, and an update occurs after a period of 48-72 hours; and D*PE: after download, a period of more than 72 hours has elapsed before uninstalled, and then the sequence ends.

The statistical process is performed by string matching. After the statistical analyses are completed, the results are averaged according to the method described in the previous section to obtain the extracted statistical results of the features.

(3) Trainer.

The trainer is implemented as a Python script that internally uses the GradientBoostingRegressor class of the scikit-learn library. Scikit-learn language is an open-source development tool library for Python development, which is mainly used in statistical learning, machine learning. The GradientBoostingRegressor class in scikit-learn is a realization of gradient boosted regression tree algorithm by scikit-learn. The latter is a regression algorithm based on the gradient descent concept. The trainer performs parameter debugging according to the pre-set value range and granularity of the trainer. The specific debugging process is as follows: for each set of model parameters, the training data is randomly divided into five copies, and then 5 fold cross-validation is conducted. For each experiment, 4 data sets were used as the training set and 1 data set was used as the test set, to obtain a Kendall's tau value between the predicted result and the actual result as the parameters for the current group. After all 5 groups of experiments were completed, the average of Kendall's tau values from the 5 groups was the final result of this group of parameters. After trying all the parameters, the best one is selected as the end result of the training, and to obtain the definite model.

(4) Predictor.

For each application to be predicted, the predictor first extracts features of the application through the data preprocessor and behavioral feature extractor, and then inputs the extracted features into the trained model to produce a predictor having a value within [0,1], which is the prediction result for the quality of the application.

The disclosed method and system are flexible in their deployment requirement. In addition to the above-described examples, they can be deployed to in a variety of other ways such as other forms (such as large-scale clusters, cloud servers, etc.) of hardware deployment, and other system software suitable for hardware (such as Windows Server, RedHat, etc.). The data pre-processor, the behavioral feature extractor, the trainer and the predictor can be written in other programming languages (e.g. Java, C/C++, R, etc.). Data may also be organized in other possible formats (such as SQL, MongoDB etc.).

The above embodiments are merely intended for describing the technical solutions of the present invention instead of limiting the present invention. Those skilled in the art can modify or replace the technical solutions of the present invention without departing from the spirit and scope of the present invention, The scope of protection should be subject to the claims.

What is claimed is:

1. A method for determining the quality of a computer application based on user behaviors of application management, comprising:

1) pre-processing user management behavior data of applications; and sorting the user management behavior data between each user and each application in a chronological order to obtain a sequence of management behaviors as a training set by one or more processors, wherein the user management behavior data includes downloading an application, uninstalling an application, and updating an application, wherein user management behavior data includes: a user identifier for a user conducting a management behavior, an identity for the application corresponding to the management behavior, and a time when a management behavior occurred, wherein the sequence of management behaviors includes an application downloading behavior, an application uninstall action, and an application update action, wherein a first letter is added to a start of the sequence to indicate head of the sequence, wherein a second letter is added to an end of the sequence to indicate the end of the sequence;

2) extracting features of user application management behaviors from the sequence of management behaviors by the one or more processors;

3) establishing a multi-dimensional independent variable space using the extracted features by the one or more processors, wherein each application in the training set is considered as a point in the space, wherein a value of an independent variable dimension is a value of a feature corresponding to the independent variable dimension; training a model according to the space; and debugging the model to obtain optimal model parameters and a definite regression model; and 4) extracting features of user application management behaviors of a to-be-predicted application according to steps 1) and 2), inputting the extracted features into the regression model; and outputting a determination for quality of the to-be-predicted application by the regression model.

2. The method of claim 1, wherein in step 1), further comprising:
filtering the sequence of management behaviors to remove unclear user evaluations; and
retaining only applications that users have shown clear preferences.

3. The method of claim 2, further comprising:
screening applications associated the sequence of management behaviors using a binomial distribution probability test based on numbers of likes and dislikes;
retaining applications having 95% probability confidence of user preferences; and
sequencing user management behavior data of retained applications comprising at least two user application management behaviors aside S and E.

4. The method of claim 1, wherein in step 2) the features of the management behaviors of each application comprise: a number of the management behaviors in the sequence associated with the application, an average length of a sequence of management behaviors, and time intervals between continuous management behaviors in the sequence of management behaviors.

5. The method of claim 4, wherein step 2) further comprises;
for each of the features, extracting a number of the feature in the application to obtain an average number of the feature in the sequence of management behaviors as a value of the feature.

6. The method of claim 1, wherein in step 3) a value of a dependent variable in the multidimensional independent variable space is a linear number in [0,1] interval for a user's rating of application.

7. The method of claim 1, wherein in step 3) a multi-folding training method is adopted to train the model.

8. A system for determining the quality of an application based on user behaviors of application management, comprising:

a data preprocessor configured to pre-process user management behavior data of applications, and to sort the user management behavior data between each user and each application in a chronological order to obtain a sequence of management behaviors as a training set,
wherein the user management behavior data includes downloading an application, uninstalling an application, and updating an application,
wherein user management behavior data includes: a user identifier for a user conducting a management behavior, an identity for the application corresponding to the management behavior, and a time when a management behavior occurred,
wherein the sequence of management behaviors includes an application downloading behavior, an application uninstall action, and an application update action, wherein a first letter is added to a start of the sequence to indicate head of the sequence, wherein a second letter is added to an end of the sequence to indicate the end of the sequence; and
one or more processors comprising:
a behavioral feature extractor configured to extract features of user application management behaviors from the sequence of management behaviors;
a trainer configured to establish a multi-dimensional independent variable space using the extracted features, wherein each application in the training set is considered as a point in the space, wherein a value of an independent variable dimension is value of a feature corresponding to the independent variable dimension, wherein the trainer is configured to train a model in the space and debug the model to obtain optimal model parameters and a definite regression model; and
a predictor configured to receive features of user application management behaviors of a to-be-predicted application extracted by the data preprocessor and behavioral feature extractor, to input the features into the regression model, wherein the regression model outputs a determination for quality of the to-be-predicted application.

* * * * *